US006452102B1

(12) United States Patent
DeForest, Jr. et al.

(10) Patent No.: US 6,452,102 B1
(45) Date of Patent: Sep. 17, 2002

(54) HIGH VOLTAGE CABLE TERMINATION

(75) Inventors: Robert Duke DeForest, Jr., South Jordan; Ernest Wayne Reno, Kearns, both of UT (US)

(73) Assignee: Pen Cabling Technologies LLC, Salt Lake City, UT (US)

( * ) Notice: Subject to any disclaimer, the term of this patent is extended or adjusted under 35 U.S.C. 154(b) by 0 days.

(21) Appl. No.: 09/750,747

(22) Filed: Dec. 29, 2000

(51) Int. Cl.[7] .......................... H02G 15/08
(52) U.S. Cl. .................. 174/75 C; 174/78; 174/88 C
(58) Field of Search .................. 174/74 R, 75 C, 174/78, 102 SC, 120 SC, 84 R, 88 C; 439/98, 610

(56) References Cited

U.S. PATENT DOCUMENTS

| | | | | | |
|---|---|---|---|---|---|
| 3,142,721 | A | * | 7/1964 | Long | 174/151 |
| 4,382,653 | A | | 5/1983 | Blanchard | |
| 4,427,256 | A | | 1/1984 | Reif et al. | |
| 4,520,230 | A | * | 5/1985 | Uesugi et al. | 174/107 |
| 4,759,727 | A | | 7/1988 | Moji et al. | |
| 4,767,362 | A | | 8/1988 | Moji | |
| D301,458 | S | | 6/1989 | Tierie | |
| 5,154,638 | A | | 10/1992 | Sireul et al. | |
| 5,310,361 | A | | 5/1994 | Muchowicz et al. | |
| 5,508,475 | A | * | 4/1996 | Profiri et al. | 174/19 |
| 5,707,725 | A | | 1/1998 | Meszaros | |
| 5,821,461 | A | * | 10/1998 | Sackett | 174/75 B |
| 5,897,396 | A | * | 4/1999 | Maejima | 439/275 |
| 5,917,153 | A | * | 6/1999 | Geroldinger | 174/88 C |
| 5,962,812 | A | * | 10/1999 | Miyazaki | 174/78 |

* cited by examiner

*Primary Examiner*—Chau N. Nguyen
(74) *Attorney, Agent, or Firm*—Killworth, Gottman, Hagan & Schaeff, LLP

(57) ABSTRACT

A high voltage cable termination is provided where a cable is wrapped in a dielectric tape, and a braided shield. The shield and dielectric tape are stripped back exposing the conductors. An inner ferrule having a flanged portion and a sleeve portion is slipped over the cable so that the conductors and dielectric tape pass through the inner ferrule and the shield fans out and is slipped over the sleeve portion of the inner ferrule. An outer ferrule is slipped over the sleeved portion of the inner ferrule, and is crimped thereto, thus pinching the shield between the inner and outer ferrules. A pin is crimped to the end of each conductor, and an insulating overmold is applied over the conductors.

22 Claims, 4 Drawing Sheets

HIGH VOLTAGE CABLE TERMINATION

BACKGROUND OF THE INVENTION

The present invention relates in general to a high voltage cable termination, and in particular to a high voltage cable termination for interconnecting a high voltage power source to an X-ray device.

In the use of high voltage equipment, such as an X-ray device, it is often necessary to connect the equipment to a separate power supply with one or more interconnecting cables. The interconnecting cables must be capable of transmitting high voltages, for example in the range of 75,000 to 150,000 volts. Further, the high voltage cable must provide flexibility so as to be able to interconnect power sources and mobile equipment over distances sometimes in excess of 100 feet.

Known high voltage cable terminations often include a number of parts requiring a substantial amount of manual assembly and maintenance. Further, because of the complexity of some known cable terminations, it may not be possible to permit the components to be tested in an assembled state prior to energization. For example, one known high voltage cable termination uses grease between the cable termination and the receptacle port comprising the connector assembly. The grease is intended to displace air in the space between the cable termination and the receptacle to prevent or reduce any high voltage arcing that may occur. However, application of the grease, for example petroleum jelly, is inexact. It is difficult to determine when the grease satisfactorily fills the gap because a serviceperson cannot see into the blind termination. While fluid transformer oil is known to be used similar X-ray cable terminations, the transformer oil use is restricted to installations where the connector assembly is installed, and remains in a vertical position. Attempts to use transformer oil in a tipped or rotated position have been unsuccessful because the termination becomes bulky and unwieldy to accommodate a sealed oil compartment. For example, it is known to include an external oil chamber externally mounted to the cable termination. While the external chamber may account for oil expansion due to temperature changes, the chamber adds to the size of the termination and is subject to damage. Oil-filled terminations often increase costs of fabrication, as well as increase the dimensions of the termination because the termination must account for expansion space for the thermal expansion of the insulating oil. Further, such oil filled terminations include the risk of leakage which affects the environment, and include the potential risk of flashover.

Additionally, high voltage cable terminations are often large and bulky. This creates complications for certain installations. For example, in some hospital applications, the high voltage cable must be pulled considerable distances, sometimes one hundred feet or more, through conduit. Where the cable termination exceeds the diameter of the conduit, the cable must be drawn through the conduit, then subsequently the termination must be installed. Installing the cable termination on-site creates a time consuming process, and quality of cable termination is often degraded. However, many cable terminations that can be assembled and disassembled on site are often difficult to assemble and use. For example, one known cable termination provides a boot that is provided over a cable jacket. Annular grooves are provided along the surface of the boot, arranged to receive a two-piece retainer ring. A nut engages the retainer ring completing the assembly. Alternatively, a two-piece retaining ring is held together by a split ring, provided in an external groove. However, assembling the termination is not easy inside the equipment wall and parts may be dropped causing damage to the equipment. Further, binding might occur as the nut is screwed in place between the nut and the retainer ring, and the retainer ring and the boot.

Accordingly, there is a need for a high voltage cable termination with improved connectivity characteristics that is simple in construction and easy to use.

SUMMARY OF THE INVENTION

The present invention overcomes the disadvantages of previously known cable terminations wherein a high voltage cable termination includes a cable wrapped in a dielectric tape, and a braided shield. The shield and dielectric tape are stripped back exposing the conductors. A first, or inner ferrule having a flanged portion and a sleeve portion is slipped over the cable so that the conductors and dielectric tape pass through the inner ferrule and the shield fans out and is slipped over the sleeve portion of the inner ferrule. A second, or outer ferrule is slipped over the sleeved portion of the inner ferrule, and is crimped thereto, thus pinching the shield between the inner and outer ferrules. A pin is crimped to the end of each conductor, and an insulating overmold is applied over the conductors.

In accordance with one embodiment of the present invention, a high voltage cable termination comprises a cable having a first cable end, a plurality of conductors contained in a first insulating material, a dielectric tape wrapping around at least a portion of the conductors, a braided shield wrapped around the dielectric tape, and a cable jacket wrapped around the braided shield. The cable jacket is stripped back from the first cable end exposing a portion of the braided shield, the dielectric tape and the conductors. The braided shield is stripped back from the first cable end exposing a portion of the dielectric tape and the conductors, and the dielectric tape stripped back from the first cable end exposing a portion of the conductors. An inner ferrule has an opening extending entirely therethrough, and includes a flanged portion and a sleeve portion. The inner ferrule is slipped over the cable so that the flanged portion is proximate to the first cable end. The conductors and the dielectric tape extend through the opening, and the braided shield extends over the outside surface of the sleeve portion of the inner ferrule. An outer ferrule is inserted over the sleeve portion of the inner ferrule and crimped thereto, thus pinching the braided shield between the inside surface of the outer ferrule, and the outside surface of the inner ferrule. A pin is secured to the end of each of the plurality of conductors and an insulating material is applied to the exposed portion of the conductors, extending up to the flanged portion of the inner ferrule.

In accordance with another embodiment of the present invention, a high voltage cable termination comprises an inner ferrule having an opening therethrough. A cable has a first cable end, a plurality of insulated conductors and a shield, sheathing at least a portion of the length of the cable. The plurality of conductors run through the opening in the inner ferrule, and the shield wraps around the outside surface of the inner ferrule and an outer ferrule is positioned over the inner ferrule and secured thereto, securing the shield between the inner and outer ferrules.

The inner ferrule preferably comprises a sleeve portion and a flange portion. An opening extends axially through the sleeve portion and exits through the face of the flanged portion. The inner ferrule is installed over the cable such that the flange portion is proximate to the first cable end. Where the opening exits the inner ferrule on the face of the flanged portion, the edge defining the opening may optionally include a chamfer. Secured over the circumference of the sleeve portion, and adjacent to the flanged portion, a key is provided for securing the cable termination once installed in a suitable receptacle. The key is arranged to allow the high voltage cable termination to be lockably securable to the socket or receptacle. The key may be formed in any number of ways, and may optionally include at least one pair of parallel, planar surfaces. The inner ferrule is arranged to form the back end of the cable termination upon being inserted into a receptacle. The flanged portion of the inner ferrule is arranged to guide the cable termination into a corresponding socket. This may be accomplished by providing a contour to the periphery of the opening extending through the inner ferrule along the face of the flanged portion.

The outer ferrule is secured to the inner ferrule, preferably by crimping. The inner and outer ferrules pinch the braided shield creating a solid ground. While the inner and outer ferrules may be constructed of any suitable conductive material, it is preferable that the inner ferrule is constructed of brass, and the outer ferrule is constructed out of aluminum. Further, a pin is electrically coupled to the end of each of the plurality of insulated conductors. Each pin is preferably constructed of brass. The plurality of insulated conductors may include four conductors. As such, the high voltage cable termination comprises a first pin electrically coupled to the end of a first one of the four conductors, a second pin electrically coupled to the end of a second one of the four conductors, and a third pin electrically coupled to the ends of both the third and fourth ones of the four conductors. An overmold of insulating material encases the exposed portion of the conductors. While the overmold may be constructed of any number of suitable insulating materials, it is preferable to construct the overmold from ethylene propylene rubber.

The cable termination may optionally include a semiconductive layer wrapped around the cable under the shield. The semiconductive layer preferably extends underthe inner ferrule, and may be constructed of an extruded layer, or a dielectric tape.

In another embodiment of the present invention, a high voltage cable termination comprises a cable having a first cable end, and four conductors. Each of the four conductors are individually contained in a first insulating material of the cable. A dielectric tape wraps around at least a portion of the conductors, and a braided shield wraps around the dielectric tape. A cable jacket wraps around the braided shield, and serves as a protective outer coating of the shield. The cable jacket is stripped back from the first cable end exposing a portion of the braided shield, the dielectric tape and the conductors. The braided shield is stripped back from the, first cable end exposing a portion of the dielectric tape and the conductors, and the dielectric tape is stripped back from the first cable end exposing a portion of the conductors. An inner ferrule has an opening extending entirely therethrough, and includes a flanged portion and a sleeve portion. The inner ferrule is slipped over the cable so that the flanged portion is proximate to the first cable end, and the conductors and the dielectric tape extend through the opening, and the braided shield extends over the outside surface of the sleeve portion of the inner ferrule. An outer ferrule is inserted over the sleeve portion of the inner ferrule and crimped thereto, thus pinching the braided shield between the inside surface of the outer ferrule, and the outside surface of the inner ferrule.

A first pin is electrically coupled to the end of a first one of the four conductors. A second pin is electrically coupled to the end of a second one of the four conductors, and a third pin electrically coupled to the ends of both the third and fourth ones of the four conductors. An insulating material is applied to the exposed portion of the plurality of conductors, extending up to the flanged portion of the inner ferrule.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings which form a part hereof, and in which is shown by way of illustration, and not by way of limitation, specific preferred embodiments in which the invention may be practiced. It is to be understood that other embodiments may be utilized and that logical, mechanical and electrical changes may be made without departing from the spirit and scope of the present invention. Further, while the present invention is generally applicable to cable terminations for high voltage cables, it will be described herein with reference to a high voltage cable termination for an X-ray device.

Figure 1:
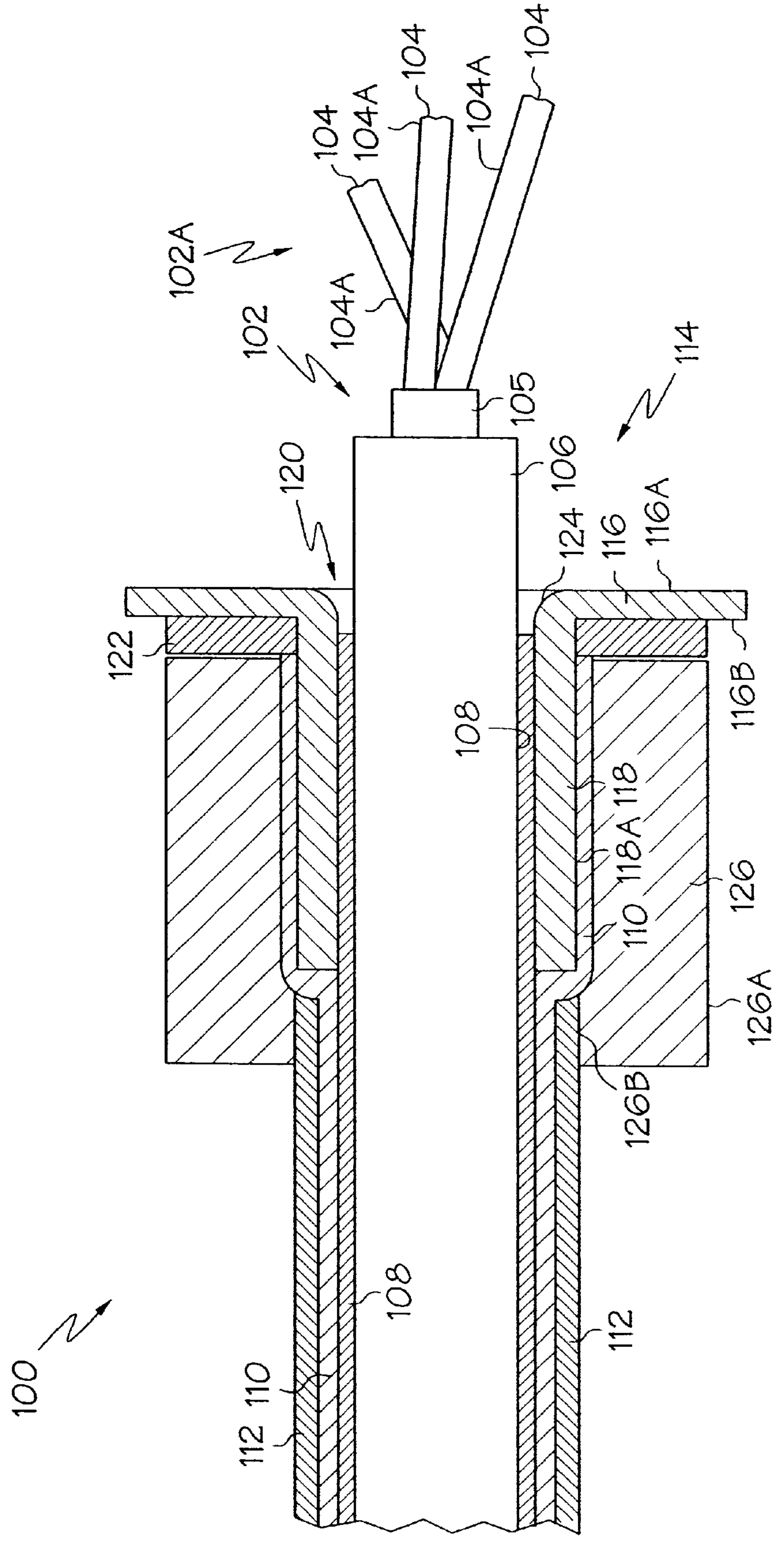
FIG. 1 is a cross sectional view of the high voltage termination according to the present invention.

As shown in FIG. 1, the high voltage cable termination 100 according to the present invention is illustrated. A cable 102 has a first end 102A which defines the plug end of the cable 102, and includes a plurality of conductors 104. Each conductor 104 includes an insulating cover 104A. The insulating cover 104A may be a polyester material or other suitable insulator. An extruded, semiconductive layer 105 is encapsulated over the conductors 104. A dielectric insulating material 106 encapsulates the semiconductive layer 105 as well as the conductors 104. The dielectric insulating material 106 should be an ozone resistant, contaminant free, high voltage dielectric material. A semiconductive layer 108 is wrapped around the dielectric insulating material 106. A braided shield 110 is weaved around the semiconductive layer 108. Finally, a dielectric cable jacket 112 covers the braided shield 110. It should be appreciated that the cable 102 may be virtually any length to meet the needs of the particular high voltage application. For example, it is not uncommon for the cable to exceed 100 feet in length. Further, additional layers of shielding and insulation may be provided, depending upon the construction of the cable 102. For example, the insulating cover 104A encapsulating each conductor 104 may comprise a layer of polyester tape and a metalized layer of polyester shielding tape. Further, the conductors 104 may be twisted together, provided as twisted pairs, or provided in other suitable configurations.

The semiconductive layer 108 may be an extruded material layer or semiconductive tape. The semiconductive layer 108 typically has a resistance such that when applied between two elements of the cable 102, the adjacent surfaces of the two elements will maintain substantially the same potential. The semiconductive layer 108 preferably wraps continually throughout the entire length of the cable 102, and is stripped back at the cable first end 102A to expose the conductors 104. For example, a 20-mil (0,51 mm) self-amalgamating ethylene propylene rubber (EPR) based high voltage tape is suitable for insulating and jacketing the conductors 104 over an operating voltage of about 600 volts through 138 kV. The semiconductive layer 108 may include a polyvinyl chloride (PVC) backing, Pressure sensitive (rubber based adhesive), and built in memory (elasticity) so that the semiconductive layer 108 may hold tightly and provide pressure without slipping or flagging.

The braided shield 110 is preferably a non-magnetic, metallic material applied over the insulated conductors 104 to confine the electric field to the insulation. The braided shield 110 preferably forms a continuous jacket over the semiconductive layer 108, extending continually throughout the entire length of the cable 102, and is stripped back at the cable first end 102A to expose the conductors 104 and a portion of the semiconductive layer 108. The cable jacket 112 serves to protect the cable 102, and provide an insulated, outer coating that is flexible and resilient. The cable jacket 112 is stripped back at the cable first end 102A to expose the conductors 104, a portion of the semiconductive layer 108, and a portion of the braided shield 110.

Figure 2:
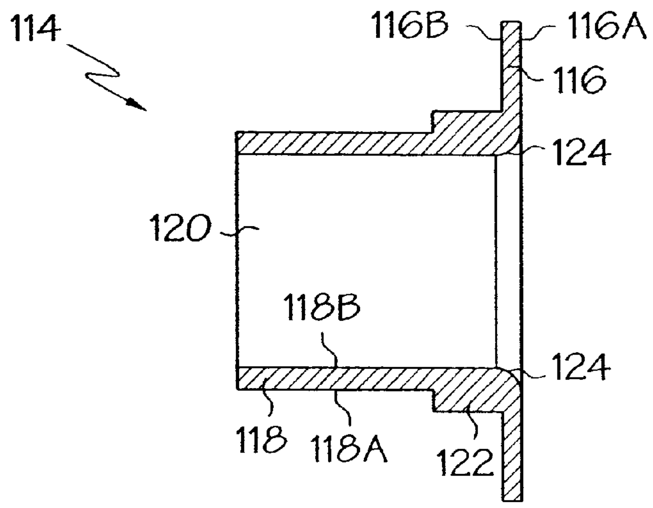
FIG. 2 is a cross sectional side view of the inner ferrule according to the present invention.
Figure 3:
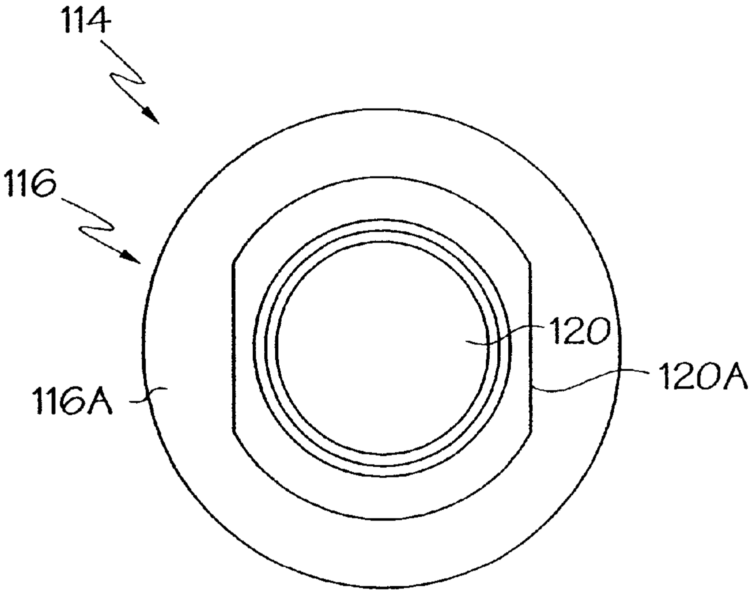
FIG. 3 is a diagrammatic view of a surface of the flanged portion of the inner ferrule according to the present invention.

Referring to FIGS. 1 and 2, an inner ferrule 114 includes a flanged portion 116 having a flange first surface 116A and a flange second surface 116B. A sleeve portion 118 has a sleeve first surface, or outer surface 118A and a sleeve second surface, or inner surface 118B (Not shown in FIG. 1). The sleeve portion 118 extends out from, and normal to the flange second surface 116B. An opening 120 extends axially, entirely through the inner ferrule 114. The circumferential edge 124 defines the opening 120 in the flanged portion 116, and is chamfered. As best illustrated in FIG. 1, the chamfer allows a gradual exit of the cable 102. Referring to FIG. 3, the opening 120 extends through the first surface 116A and includes an opening edge periphery 120A arranged in a specific configuration useful for aiding with alignment of the high voltage termination 100 (not shown in FIG. 3). Referring to FIG. 1, the inner ferrule 114 includes a key 122 adjacent to the flange second surface 116B. As illustrated in FIG. 1, the key 122 is formed over the outer circumference of the sleeve 118, or sleeve first surface 118, adjoining the flange second surface 116B, and includes at least one pair of parallel, planar surfaces. The flange second surface is the face of the flange from which the sleeve portion 118 extends. It should be observed that other key arrangements may be implemented. The key 122 forms the means for which the high voltage cable termination 100 is easily secured and removed from a plug receptacle (not shown) as more fully described herein.

The inner ferrule 114 is slipped over the cable 102, such that the flanged portion 116 is proximal to the cable first end 102A, and the sleeve portion 118 extends axially along the length of the cable 102. As such, the cable 102 extends through the opening 120. The orientation of the inner ferrule 114, and in particular the flange first surface 116A defines an integral portion of the back of the high voltage cable termination 100 as more fully described herein.

The semiconductive layer 108 is trimmed back from the cable first end 102A such that it extends along the cable length towards the cable first end 102A, and extends at least partially through the inner ferrule 114. Preferably, the semiconductive layer 108 extends under the entirety of the sleeve portion 118, and stops beneath the flanged portion 114.

The braided shield 110 is fanned out and slipped over the sleeve portion 118 of the inner ferrule 114 and extends along the outer periphery 118A of the sleeve portion 118. Preferably, the braided shield 110 extends up, and abuts the flanged portion 116, however, it will be appreciated that the braided shield 110 can stop short of the flanged portion 116.

An outer ferrule 126 is slipped over the cable 102 and sleeve portion 118 of the inner ferrule 114 such that the braided shield 110 is sandwiched between the inner periphery 126B of the outer ferrule 126, and the outer periphery 118A of the inner ferrule 118. The outer ferrule 126 is then crimped to the inner ferrule 114 providing a ground. The inner and outer ferrules 114, 126 may be constructed out of any suitable conductive material, however, the inner ferrule 114 is preferably constructed out of brass, while the outer ferrule, 126 is preferably constructed out of aluminum.

The shield 110 is typically woven or braided to provide, among other things, increased strength and flexibility. The cable 102, and hence the braided shield 110 is bendable, thus the braided shield 110 is considered to be approximately only 85% effective, because it provides approximately 85% coverage of the cable 102. In conventional cases, the braided shield 110 is string braided out prior to the termination (not shown) and is soldered directly to the terminal connector, (not shown). Thus the shield, which is typically about 85% effective in the braided portion, is reduced in efficiency in areas of the cable to approximately 40%. However, as illustrated in FIG. 1, in the present invention, the braided shield 110 is fanned outland crimped between inner and outer ferrules 114, 126. As such, the shield remains in tact, thus the 85% effectiveness remains fairly constant throughout the cable 102.

Figure 4:
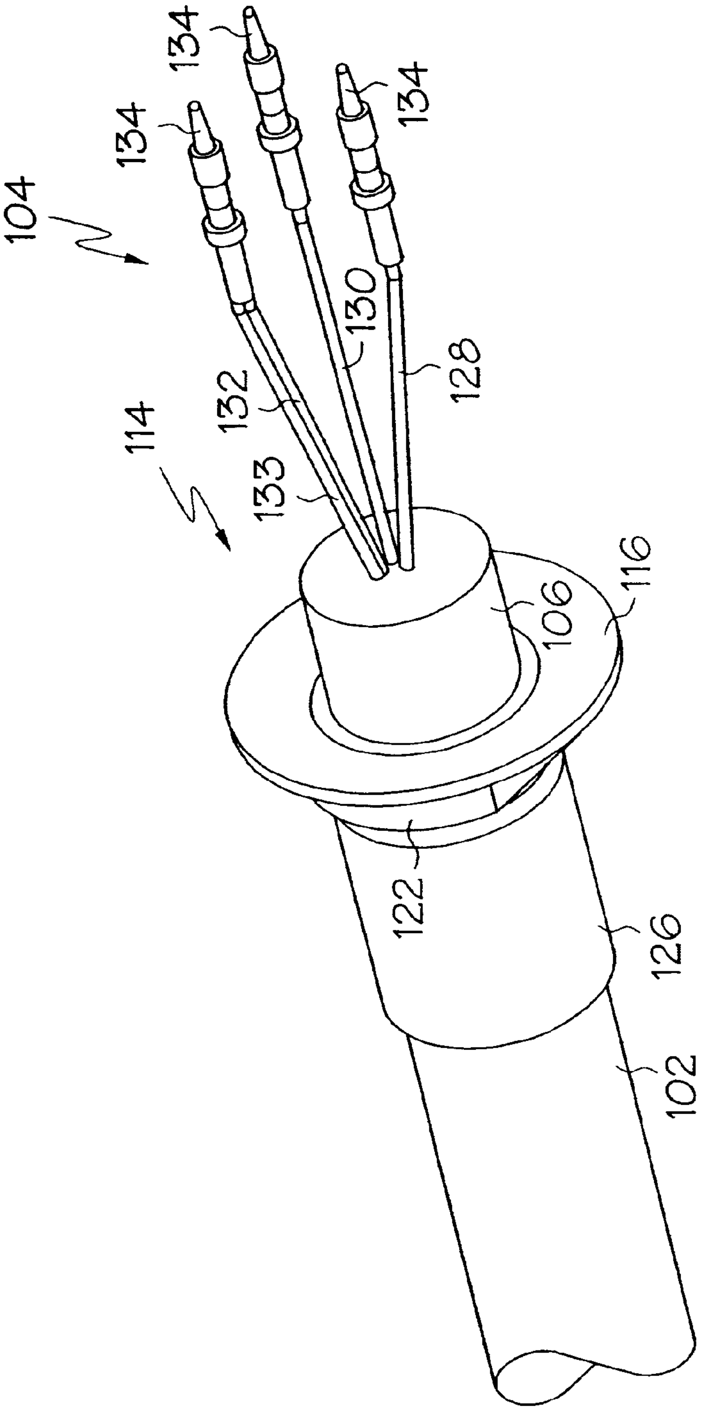
FIG. 4 is an isometric view of the high voltage termination according to the present invention, with the overmold removed from the conductors to illustrate the arrangement of the conductors; and, FIG. 5 is an isometric view of the high voltage termination according to the present invention, illustrating a completed assembly where an overmold is positioned over the conductors.

As shown in FIG. 4, pins 134 are crimped to the tips of the exposed conductors 104. Preferably the pins 134 are brass, however other suitable materials may be used. The cable 102 typically includes at least three conductors 104 for applications where cathode and anode voltages are supplied to an X-ray tube. Still other types of X-ray devices require a four conductor connection, notably, when providing a grid controlled lead. A cable 102 suitable for connecting high voltage power supplies to X-ray equipment, and rated for use in 75 kv X-ray high voltage assemblies is provided by The Okonite Company, 102 Hilltop Road, Ramsey, N.J. 07446.

It is sometimes desirable to use a four conductor cable, even where three conductors are actually need ed. For example, for long cable distances, a twisted conductor configuration is employed. Where only three pins 134 are required, a four conductor cable may be configured by crimping a pin 134 to the end of first and second conductors 128, 130, and crimping a single pin 134 to two of the conductors, preferably the ground conductors 132, 133.

Figure 5:
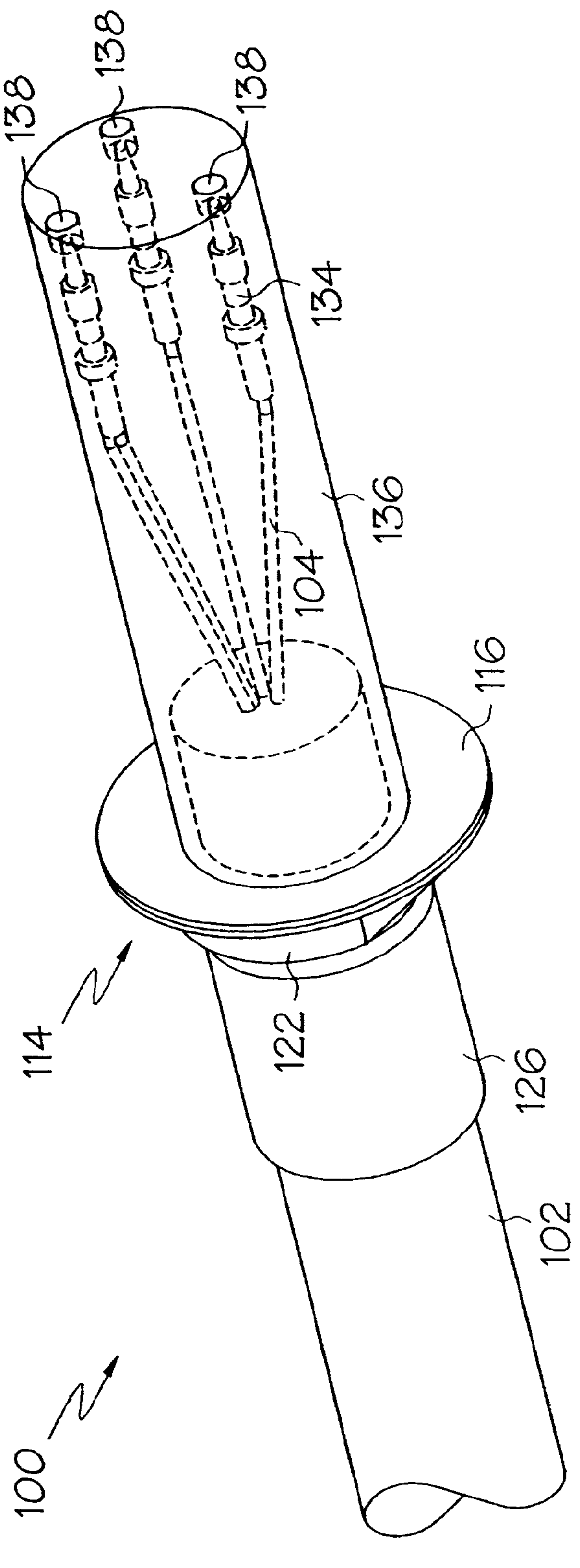

As shown in FIG. 5, the high voltage cable assembly 100 includes an overmold 136 which jackets the conductors 104. The conductors 104 and pins 134 are illustrated in dashed lines in FIG. 5 to illustrate that they are encapsulated within the overmold 136. The overmold 136 must bond with the conductors 104 so that no air or gas pockets are formed. At such high voltages, air pockets or gas can heat up and arc destroying the high voltage connector 100. Accordingly, the overmold 136 is formed from a vulcanization mold process such that no air or gas pockets are created in the molding and curing stages. The overmold 136 is a dielectric material which forms the outer portion of the high voltage cable termination 100. For example, the overmold 136 may be formed from an elastomer-based compound, such as an ethylene proplyene rubber (EPR). For example, SuperOhm 3728, sold by A. Schulman, of Akron Ohio is a suitable material for the construction of the overmold. The conductors 104 are accessed by X-ray equipment (not shown) through apertures 138.

Referring to FIG. 1, in use, the high voltage cable termination 100 is inserted into a suitable receptacle (not shown). The key 122 is tightened using a suitable tool such as a wrench, and the cable is ready for use. Notably, the first surface 116A of the inner ferrule 114 provides the back portion of the termination when properly inserted in a suitable receptacle. The high voltage cable termination 100 provides excellent termination results. For example, a cable termination was constructed as described herein and tested on a typical X-ray machine. The results demonstrated that that at 135 kilovolts DC, for a period of 15 minutes, no arcing or failures occurred.

Having described the invention in detail and by reference to preferred embodiments thereof, it will be apparent that modifications and variations are possible without departing from the scope of the invention defined in the appended claims.

What is claimed is:

1. A high voltage cable termination comprising:

a cable having:

a first cable end;

a plurality of conductors contained in a first insulating material;

a semiconductive layer wrapped around at least a portion of said insulating material;

a braided shield woven around said semiconductive layer; and, a cable jacket encapsulating around said braided shield;

wherein said cable jacket is stripped back from said first cable end exposing a portion of said braided shield, said semiconductive layer, and said plurality of conductors;

said braided shield is stripped back from said first cable end exposing a portion of said semiconductive layer;

said semiconductive layer is stripped back from said first cable end exposing a portion of said first insulating material; and, said first insulating material stripped back exposing at least a portion of said conductors;

an inner ferrule having an opening extending entirely therethrough, a flanged portion, and a sleeve portion, said inner ferrule slipped over said cable so that said flanged portion is proximate to said first cable end, wherein said conductors extend through said opening, said semiconductive layer extends at least partially through said opening, and said braided shield extends over the outside surface of said sleeve portion of said inner ferrule;

an outer ferrule inserted over said sleeve portion of said inner ferrule and crimped thereto, thus pinching said braided shield and a portion of said cable jacket between the inside surface of said outer ferrule, and the outside surface of said inner ferrule;

a pin secured to the end of each of said plurality of conductors; and, a second insulating material applied to the exposed portion of said plurality of conductors, said second insulating material forming an overmold extending up to said flanged portion of said inner ferrule.

2. A high voltage cable termination comprising:

an inner ferrule having;

a sleeve portion;

a flanged portion extending generally radially out from one end of said sleeve portion having a first surface and a second surface; and, an opening through both said sleeve portion and said flanged portion;

a cable having a first cable end, a plurality of insulated conductors and a shield sheathing at least a portion of the length of said cable, said plurality of conductors running through said opening in said inner ferrule, and said shield wrapping around the outside surface of said inner ferrule; and, an outer ferrule positioned over said inner ferrule and secured thereto, securing said shield between said inner and outer ferrules, wherein said inner ferrule further comprises a key arranged over an outer circumference of said sleeve portion and adjoining said second surface of said flanged portion, said key arranged to allow said high voltage cable termination to be lockably securable to a socket.

3. The high voltage cable termination according to claim 2, wherein said inner ferrule comprises a sleeve portion and a flanged portion,, said flanged portion proximate to said first cable end, wherein said opening through said inner ferrule extends through said sleeve portion and said flanged portion.

4. The high voltage cable termination according to claim 3, wherein said inner ferrule further comprises a chamfer along an edge defining said opening through said flanged portion.

5. The high voltage cable termination according to claim 3, wherein said inner ferrule is arranged to form the back end of said cable termination upon toeing inserted into a receptacle.

6. The high voltage cable termination according to claim 3, wherein said flanged portion of said inner ferrule is arranged to guide said cable termination into a corresponding socket.

7. The high voltage cable termination according to claim 2, wherein said key includes at least one pair of parallel, planar surfaces.

8. The high voltage cable termination according to claim 2, wherein said inner ferrule is brass.

9. The high voltage cable termination according to claim 2, wherein said outer ferrule is crimped to said inner ferrule.

10. The high voltage cable termination according to claim 2, wherein said outer ferrule Is aluminum.

11. The high voltage cable termination according to claim 2, further comprising a pin electrically coupled to the end of each of said plurality of insulated conductors.

12. The high voltage cable termination according to claim 2, wherein said plurality of insulated conductors comprises four conductors, and said high voltage cable termination further comprises a first pin electrically coupled to the end of a first one of said four conductors, a second pin electrically coupled to the end of a second one of said four conductors, and a third pin electrically coupled to the ends of both the third and fourth ones of said four conductors.

13. The high voltage cable termination according to claim 2, further comprising a dielectric overmold encasing the exposed portion of said plurality of conductors.

14. The high voltage cable termination according to claim 13, wherein said overmold comprises ethylene propylene rubber.

15. The high voltage cable termination according to claim 2, further comprising a semiconductive layer between said plurality of conductors and said shield.

16. The high voltage cable termination according to claim 15, wherein said semiconductive layer comprises an extruded layer.

17. The high voltage cable termination according to claim 15, wherein said semiconductive layer comprises a dielectric tape.

18. The high voltage cable termination according to claim 2, wherein said cable further comprises a semiconductive layer between said plurality of conductors and said shield, wherein said plurality of conductors extend through said opening in said inner ferrule, and said semiconductive layer extends at least partially through said opening.

19. A high voltage cable termination comprising:

a cable having a first cable end, four conductors, each of said four conductors individually contained in an insulating cover, a dielectric insulating material around at least a portion of said insulating cover, a braided shield woven around said dielectric insulating material, and a cable jacket sheathed around said braided shield, said cable jacket stripped back from said first cable end exposing a portion of said braided shield, said braided shield stripped back from said first cable end exposing a portion of said dielectric insulating material, said dielectric insulating material stripped back from said first cable end exposing a portion of said Insulating cover, and said insulating cover stripped back to expose a portion of said conductors;

an inner ferrule having an opening extending entirely therethrough, a flanged portion, and a sleeve portion, said inner ferrule slipped over said cable so that said flanged portion is proximate to said first cable end, wherein said conductors extend through said opening, said dielectric insulating material extend's at least partially through said opening, and said braided shield extends over the outside surface of said sleeve portion of said Inner ferrule;

an outer ferrule inserted over said sleeve portion of said inner ferrule and crimped thereto, thus pinching said braided shield between the inside surface of said outer ferrule, and the outside surface of said inner ferrule;

a first pin electrically coupled to the end of a first one oft said four conductors, a second pin electrically coupled to the end of a second one of said four conductors, and a third pin electrically coupled to the ends of both the third and fourth ones of said four conductors; and, an overmold applied to the exposed portion of said plurality of conductors, said overmold extending substantially up to the flanged portion of said inner ferrule.

20. A high voltage cable termination comprising:

inner ferrule having:

a sleeve portion having a outer surface;

a flanged portion having a first surface extending generally radially out from said sleeve portion, wherein an opening extends entirely through both said sleeve portion and said flanged portion; and, a key over the circumference of the sleeve portion and adjacent to the flanged portion, said key arranged to secure said cable termination once installed in a suitable receptacle, a cable having a first cable end, a plurality of insulated conductors and a shield sheathing at least a portion of the length of said cable, said plurality of conductors running through said opening in said inner ferrule, and said shield wrapping around the outside surface of said Inner ferrule; and, an outer ferrule positioned over said inner ferrule and secured thereto, securing said shield between said inner and outer ferrules.

21. A high voltage cable termination comprising:

an inner ferrule having:

a sleeve portion having a outer surface and, a flanged portion having a first surface extending generally radially out from said sleeve portion, wherein an opening extends entirely through both said sleeve portion and said flanged portion, and said first surface of said flanged portion forms a back portion of said cable termination when said cable termination is inserted in a receptacle;

a cable having a first cable end, a plurality of conductors in a dielectric insulating material, a shield around said dielectric insulating material, and a cable jacket over said shield, wherein said inner ferrule is slipped onto said cable such that said flanged portion is proximate said first cable end, said plurality of conductors pass through said opening in said inner ferrule, and said shield slips over said outer surface of said sleeve portion; and, an outer ferrule slipped over said inner ferrule and secured thereto securing said shield between said inner and outer ferrules.

22. A high voltage cable termination comprising:

an inner ferrule having:

a sleeve portion having a outer surface and, a flanged portion having a first surface extending generally radially out from said sleeve portion, wherein an opening extends entirely through both said sleeve portion and said flanged portion defining an opening edge periphery about said first surface contoured to align and guide said high voltage cable termination while being inserted into a socket;

a cable having a first cable end, a plurality of conductors in a dielectric insulating material, a shield around said dielectric insulating material, and a cable jacket over said shield, wherein said inner ferrule is slipped onto said cable such that said flanged portion is proximate said first cable end, said plurality of conductors pass through said opening in said inner ferrule, and said shield slips over said outer surface of said sleeve portion; and, an outer ferrule slipped over said inner ferrule and secured thereto securing said shield between said inner and outer ferrules.

* * * * *

UNITED STATES PATENT AND TRADEMARK OFFICE

CERTIFICATE OF CORRECTION

PATENT NO. : 6,452,102 B1
DATED : September 17, 2002
INVENTOR(S) : DeForest, Jr. et al.

It is certified that error appears in the above-identified patent and that said Letters Patent is hereby corrected as shown below:

Column 8,
Line 34, "portion,, said" should read -- portion, said --
Line 44, "upon toeing inserted" should read -- upon being inserted --
Line 58, "ferrule Is aluminum" should read -- ferrule is aluminum --

Column 9,
Line 36, "said Insulating" should read -- said insulating --
Line 44, "extend's at least" should read -- extends at least --
Line 47, "Inner ferrule;" should read -- inner ferrule; --
Line 53, "one oft" should read -- one of --

Column 10,
Line 8, "receptacle," should read -- receptacle; --
Line 13, "Inner ferrule;" should read -- inner ferrule; --

Signed and Sealed this

Eighteenth Day of February, 2003

JAMES E. ROGAN
*Director of the United States Patent and Trademark Office*